United States Patent
Gonda et al.

(10) Patent No.: US 10,110,045 B2
(45) Date of Patent: Oct. 23, 2018

(54) METHOD FOR PRODUCING AN OSCILLATING CIRCUIT

(71) Applicant: Robert Bosch GmbH, Stuttgart (DE)

(72) Inventors: Martin Gonda, Stuttgart (DE); Guenter Lohr, Leinfelden-Echterdingen (DE); Dragan Krupezevic, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 106 days.

(21) Appl. No.: 15/188,480

(22) Filed: Jun. 21, 2016

(65) Prior Publication Data

US 2016/0380468 A1 Dec. 29, 2016

(30) Foreign Application Priority Data

Jun. 23, 2015 (DE) .................. 10 2015 211 575

(51) Int. Cl.
| | |
|---|---|
| *H02J 7/00* | (2006.01) |
| *H02J 7/02* | (2016.01) |
| *H02J 50/12* | (2016.01) |

(52) U.S. Cl.
CPC .............. *H02J 7/025* (2013.01); *H02J 50/12* (2016.02)

(58) Field of Classification Search
CPC ....................................................... H02J 7/025
See application file for complete search history.

(56) References Cited

U.S. PATENT DOCUMENTS

| | | | | |
|---|---|---|---|---|
| 2011/0146057 A1* | 6/2011 | Glazer | ................ | G06F 17/5063 29/593 |
| 2014/0180612 A1* | 6/2014 | Rejman | .............. | G01R 31/3627 702/58 |

FOREIGN PATENT DOCUMENTS

DE    102012112961 A1 *  6/2014  .............. H02J 7/025

OTHER PUBLICATIONS

DE 102012112961 A, "Inductive charging apparatus e.g. hann tool induction charging apparatus of induction system for power tool e.g. drill, has primary inductive loading unit with compensation unit that detects and adjusts parameter of oscillating circuit,", Jun. 26, 2014, single page.*

* cited by examiner

*Primary Examiner* — Vuthe Siek
(74) *Attorney, Agent, or Firm* — Norton Rose Fulbright US LLP; Gerard Messina

(57) ABSTRACT

A method for producing an electrical oscillating circuit for an inductive charging device, having at least one oscillating circuit component. In a method step, the at least one oscillating circuit component is classified as a function of a structurally caused deviation of a characteristic value of the oscillating circuit component from a nominal value.

6 Claims, 4 Drawing Sheets

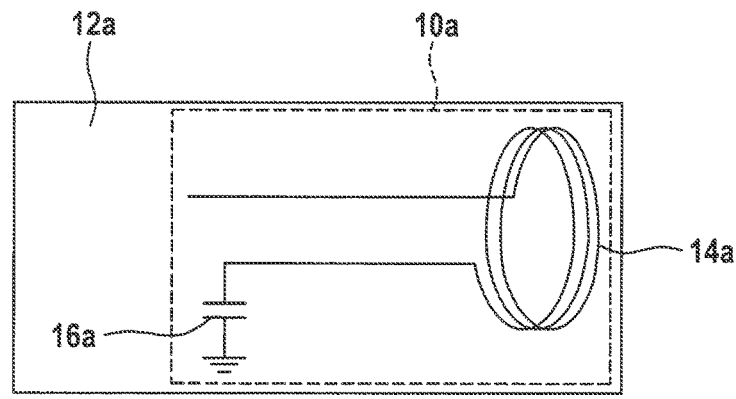
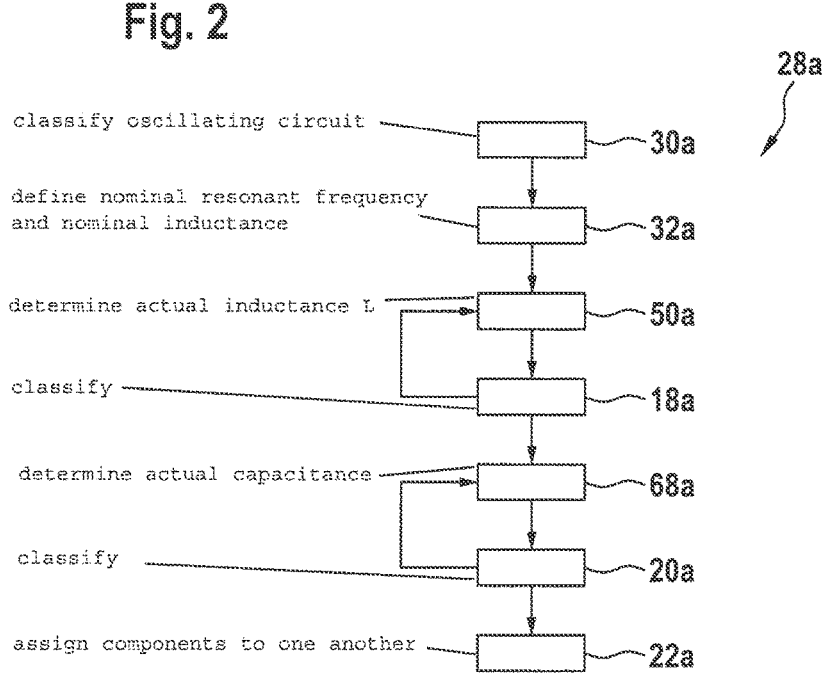

METHOD FOR PRODUCING AN OSCILLATING CIRCUIT

CROSS REFERENCE

The present application claims the benefit under 35 U.S.C. § 119 of German Patent Application No. DE 102015211575.5 filed on Jun. 23, 2015, which is expressly incorporated herein by reference in its entirety.

BACKGROUND INFORMATION

A method for producing an electrical oscillating circuit having at least one oscillating circuit component is already available.

SUMMARY

The present invention is directed to a method for producing an electrical oscillating circuit, in particular for an inductive charging device, having at least one oscillating circuit component.

In accordance with an example embodiment of the present invention, in a method step, the at least one oscillating circuit component is classified as a function of a structurally caused deviation of a characteristic value of the oscillating circuit component from a nominal value.

In this way, at particularly low cost, a small deviation of a resonant frequency of the oscillating circuit from a nominal value for the resonant frequency can be achieved. In the method, the resonant frequency can be set particularly precisely. A high-outlay and cost-intensive narrowing of a tolerance range for the characteristic value of the oscillating circuit component can be avoided. Preferably, the oscillating circuit is fashioned as a charge oscillating circuit and is provided for an inductive charging process. The oscillating circuit can be fashioned as a receive oscillating circuit or as a transmit oscillating circuit. The oscillating circuit can be provided to convert electrical energy into energy of an electromagnetic alternating field, and/or to convert energy of an electromagnetic alternating field into a wire-bound electrical current. Preferably, the oscillating circuit is provided for charging an accumulator pack. Preferably, the oscillating circuit is provided to charge a handheld power tool accumulator pack. Alternatively, the accumulator circuit can be provided for the charging of a household appliance accumulator pack, for example an accumulator pack for a vacuum cleaner or a hair dryer. In the present context, a "structurally caused deviation" of a characteristic value from a nominal value is to be understood in particular as a deviation based on fluctuations in a production process and/or on the basis of fluctuations of material properties within a tolerance range. In the present context, "classify" is to be understood in particular as assignment to one of at least two classes. The oscillating circuit component can be assigned to one of three classes, but also to one of four or more classes. In the present context, a "class" is to be understood in particular as a set of oscillating circuit components whose characteristic value is in a partial value range assigned to the class, the partial value ranges of the classes preferably covering a tolerance range of the characteristic value. The classes are empty at a beginning of the method. Preferably, the partial value ranges of the classes are fashioned symmetrically relative to the nominal value; i.e., a number of classes having partial value ranges greater than the nominal value corresponds to a number of classes having partial value ranges smaller than the nominal value. Preferably, a distribution of the characteristic values of the oscillating circuit components is at least substantially free of skew. Preferably, the distribution is at least substantially symmetrical relative to a mean value of the distribution. Particularly preferably, the distribution corresponds substantially to a normal distribution, in particular surrounding the mean value. "Provided" is to be understood in particular as meaning specifically programmed, designed, and/or equipped. The statement that an object is provided for a particular function is to be understood in particular as meaning that the object fulfills and/or executes this particular function in at least one state of use and/or operational state.

In addition, in an embodiment of the present invention, in a method step at least one further oscillating circuit component is classified as a function of a structurally caused deviation of a characteristic value of the further oscillating circuit component from a nominal value. In this way, the deviation of the resonant frequency of the oscillating circuit from a nominal value can be limited particularly easily. The oscillating circuit component and the further oscillating circuit component can have the same function or a different function.

In an advantageous embodiment of the method, in a further method step the at least two oscillating circuit components can be assigned to one another as a function of the respective classification. In this way, a particularly efficient method for production can be achieved. Various method steps can advantageously be decoupled. An item of classification information can be used particularly advantageously. A particularly flexible production process can be achieved. In the present context "assign" is to be understood in particular as meaning that the at least two oscillating circuit components are provided for one and the same oscillating circuit. For example, in the assignment the oscillating circuit components are electrically connected to one another and/or mounted on a circuit board, and act together to form the oscillating circuit.

Advantageously, in a further method step the oscillating circuit components are assigned to one another at least as a function of a sign of the respective structurally caused deviation of the characteristic value from the nominal value. In this way, effects of the deviations can at least partly mutually cancel one another. The structurally caused deviations can be compensated with regard to a resonant frequency of the oscillating circuit. Tolerance ranges for the characteristic values of the oscillating circuit components can be expanded in a cost-saving manner. The deviations can have different signs or the same signs.

Advantageously, an inductive oscillating circuit component and a capacitive oscillating circuit component are classified. In this way, a product of an inductance and a capacitance can be set particularly precisely. In the present context, an inductive oscillating circuit component is to be understood in particular as a coil. In the present context, a capacitive oscillating circuit component is to be understood in particular as a capacitor.

In addition, it is provided that the oscillating circuit component is mounted, and subsequently a structurally caused deviation of the characteristic value from the nominal value is determined. In this way, the characteristic value of the oscillating circuit component can be determined particularly easily. Efficiency of the production process can be further increased. Preferably, the oscillating circuit component is mounted on a circuit board.

In an advantageous embodiment, the structurally caused deviation of the characteristic value from the nominal value is determined by measuring a resonant frequency.

In this way, a particularly efficient measurement method can be achieved. Preferably, using a complementary reference oscillation circuit component, a test oscillating circuit is constructed whose resonant frequency is ascertained, and from this the structurally caused deviation of the characteristic value of the oscillating circuit component is derived.

In addition, an inductive charge device, in particular for a handheld power tool accumulator pack, is provided having an oscillating circuit that includes an inductive oscillating circuit component that has a structurally caused deviation from a nominal inductance, and that includes a capacitive oscillating circuit component that has a structurally caused deviation from a nominal capacitance, wherein in at least one operating state the oscillating circuit components mutually compensate these deviations, at least substantially.

A particularly efficient inductive charging device can be provided. A particularly low-loss energy transmission can be achieved. In the present context, "compensate" is to be understood in particular as meaning that a deviation, caused by a deviation of an inductance of the inductive oscillating circuit component from a nominal inductance, of a resonant frequency of the oscillating circuit from a nominal frequency is at least reduced by a deviation of a capacitance of the capacitive oscillating circuit component from a nominal capacitance. Preferably, the inductive charging device is fashioned as a handheld power tool accumulator inductive charging device.

In addition, the inductive oscillating circuit component has an actual inductance, and the capacitive oscillating circuit component has an actual capacitance, and that a product of the actual inductance and the actual capacitance deviates by less than 2 percent from a product of the nominal inductance and the nominal capacitance.

In this way, a particularly high precision of the resonant frequency of the oscillating circuit can be achieved. High quality standards for the inductive charging device can be achieved. Preferably, the product of the actual characteristic values deviates from the product of the nominal characteristic values by less than 1.5 percent, preferably less than 1 percent, and particularly preferably less than 0.5 percent.

The method according to the present invention is not intended to be limited to the application and specific embodiment described above. In particular, the method according to the present invention can have a number of steps differing from a number named herein, or a number of elements used differing from a number named herein.

BRIEF DESCRIPTION OF THE DRAWINGS

Further advantages result from the following description of the drawing. The figures show two exemplary embodiments of the present invention. The figures and the description contain numerous features in combination. A person skilled in the art will usefully also consider the features individually and combine them to form further meaningful combinations.

FIG. 1 shows a schematic representation of an inductive charging device having an oscillating circuit, FIG. 2 shows a flow diagram for a method for producing the oscillating circuit.

DETAILED DESCRIPTION OF EXAMPLE EMBODIMENTS

FIG. 1 shows a schematic representation of an inductive charging device 12a having an oscillating circuit 10a. FIG. 2 shows a flow diagram 28a of a method for producing electrical oscillating circuit 10a. In a method step 18a, an oscillating circuit component 14a of oscillating circuit 10a is classified as a function of a structurally caused deviation of a characteristic value of oscillating circuit component 14a from a nominal value. In the present exemplary embodiment, oscillating circuit 10a is provided to convert a quantity of energy of an electromagnetic alternating field into a conductor-bound electrical current. Oscillating circuit 10a has an actual resonant frequency. A degree of efficiency of the conversion is a function of a deviation of the actual resonant frequency of oscillating circuit 10a from a frequency of the alternating field. The efficiency is greater the smaller the deviation is. The resonant frequency is determined in particular by the characteristic value of oscillating circuit component 14a.

In the present exemplary embodiment, oscillating circuit component 14a is fashioned as an inductive oscillating circuit component 14a. Oscillating circuit component 14a is fashioned as a coil that has an actual inductance L as characteristic value. Further oscillating circuit component 14a is fashioned as a receive coil. Resonant frequency F is proportional to a reciprocal of a square root of actual inductance L of oscillating circuit component 14a fashioned as a coil:

$$F \sim \frac{1}{\sqrt{L}}$$

Figure 3:
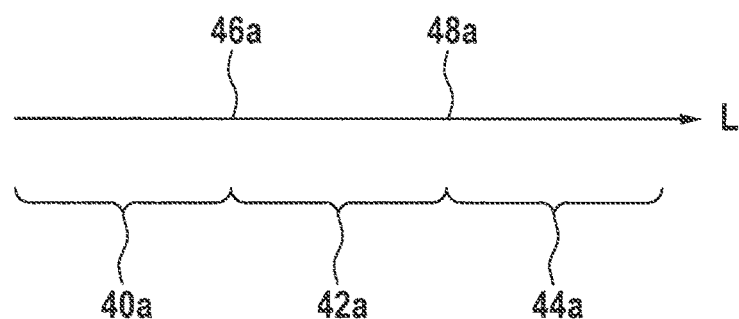
FIG. 3 shows a diagram of a value range of inductance L.

In a method step 30a for a design of oscillating circuit 10a, a nominal resonant frequency of oscillating circuit 10a and a nominal inductance are defined as nominal value (cf. FIG. 2). In the present exemplary embodiment, in a preparation step 32a a value range of the characteristic value of oscillating circuit component 14a is divided into three classes 34a, 36a, 38a. Classes 34a, 36a, 38a correspond respectively to a first partial value range 40a, a second partial value range 42a, and a third partial value range 44a of the characteristic value (cf. FIG. 3 and FIG. 5). A first boundary value 46a is defined that divides first partial value range 40a of a class 34a for smaller characteristic values from second partial value range 42a of a class 36a for medium characteristic values. A second boundary value 48a is defined that divides second partial value range 42a of class 36a for medium characteristic values from third partial value range 44a of a class 38a for larger characteristic values. The nominal value lies in second partial value range 42a. Second partial value range 42a includes the nominal value.

In a method step 50a for a measurement of the characteristic value, actual inductance L is determined of oscillating circuit component 14a, fashioned as a coil. In method step 18a for classification, a structurally caused deviation of the characteristic value from the nominal value is determined. In method step 18a, oscillating circuit component 14a is assigned to one of the three classes 34a, 36a, 38a as a function of a structurally caused deviation of the characteristic value. In method step 18a, inductive oscillating circuit component 14a is classified. Method step 50a for measurement and method step 18a for classification can be repeated for a plurality of oscillating circuit components 14a having the same function, for example for a plurality of coils. As a result, each of the three classes 34a, 36a, 38a contains at least one oscillating circuit component 14a.

Oscillating circuit component 14a is classified as a function of a sign of a deviation of the characteristic value from the nominal value. If the characteristic value is less than first boundary value 46a, the deviation is negative and oscillating circuit component 14a is assigned to class 34a, which is assigned to first partial value range 40a. If the characteristic value is greater than second boundary value 48a, the deviation is positive and oscillating circuit component 14a is assigned to class 38a, which is assigned to third partial value range 44a. If the characteristic value lies between boundary values 46a, 48a, or corresponds to one of the boundary values 46a, 48a, oscillating circuit component 14a is assigned to class 36a, which corresponds to second partial value range 42a.

In a further method step 20a, a further oscillating circuit component 16a is classified as a function of a structurally caused deviation of a characteristic value of further oscillating circuit component 16a from a nominal value. In method step 30a for the design of oscillating circuit 10a, a nominal value is also defined for further oscillating circuit component 16a. In the present exemplary embodiment, further oscillating circuit component 16a is fashioned as a capacitive oscillating circuit component 16a. Further oscillating circuit component 16a is fashioned as a capacitor. Further oscillating circuit component 16a has as characteristic value an actual capacitance C. Resonant frequency F is proportional to a reciprocal of a square root of actual capacitance C of oscillating circuit component 16a fashioned as a capacitor:

$$F \sim \frac{1}{\sqrt{C}}.$$

Figure 4:
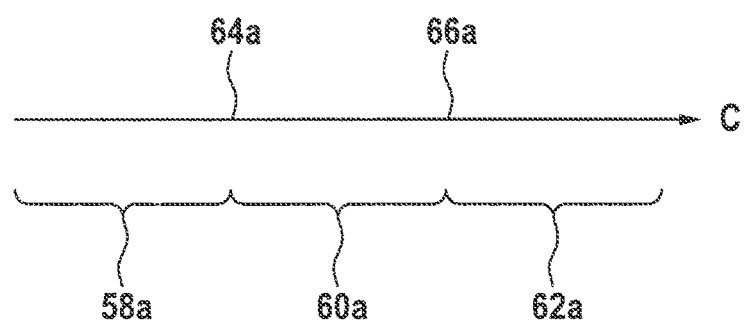
FIG. 4 shows a diagram of a value range of capacitance C.
Figure 5:
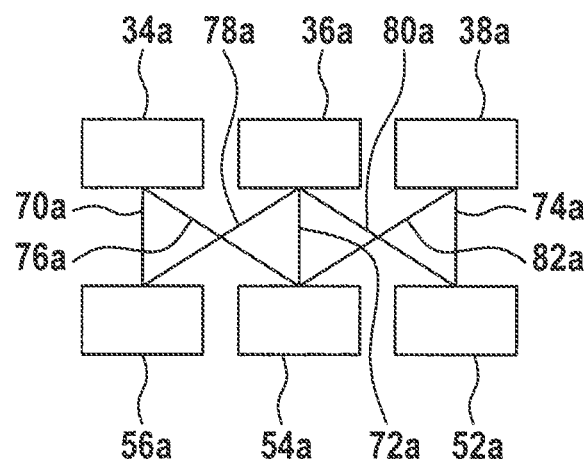
FIG. 5 shows a schematic representation of classes of oscillating circuit components with assignments.

In preparation step 32a, a value range of the characteristic value of further oscillating circuit component 16a is divided into three classes 52a, 54a, 56a (cf. FIG. 5). Analogous to oscillating circuit component 14a fashioned as a coil, classes 52a, 54a, 56a correspond respectively to a first partial value range 58a, a second partial value range 60a, and a third partial value range 62a of the characteristic value (cf. FIG. 4). A first boundary value 64a is defined that separates first partial value range 58a from second partial value range 60a. A second boundary value 66a is defined that separates second partial value range 60a from third partial value range 62a.

In a method step 68a for measuring the characteristic value, actual capacitance C of oscillating circuit component 16a fashioned as a capacitor is determined. In method step 20a for classification, the structurally caused deviation of the characteristic value from the nominal value is determined. In method step 20a, further oscillating circuit component 16a is assigned, as a function of the structurally caused deviation of the characteristic value, to one of the three classes 52a, 54a, 56a. In method step 20a, capacitive oscillating circuit component 16a is classified. Method step 68a for measurement and method step 20a for classification are repeated for a plurality of further oscillating circuit components 16a having the same function, for example for a plurality of capacitors. As a result, each of the three classes 52a, 54a, 56a contains at least one oscillating circuit component 16a. Analogous to oscillating circuit component 14a fashioned as a coil, further oscillating circuit component 16a is classified as a function of a sign of the deviation.

In a further method step 22a, the at least two oscillating circuit components 14a, 16a are assigned to one another as a function of the respective classification. In method step 22a, a respective oscillating circuit component 14a is respectively assigned to a further oscillating circuit component 16a fashioned as a capacitor. In method step 22a, pairs are formed made up respectively of an oscillating circuit component 14a and a respective further oscillating circuit component 16a. In the assignment, a class 34a, 36a, 38a of an oscillating circuit component 14a determines a class 52a, 54a, 56a of a further oscillating circuit component 16a.

Oscillating circuit components 14a, 16a are assigned to one another as a function of a sign of the respective structurally caused deviation of the characteristic value from the nominal value. In the present exemplary embodiment, an oscillating circuit component 14a and a further oscillating circuit component 16a are assigned to one another whose deviations have opposite signs. An oscillating circuit component 14a whose deviation of the characteristic value from the nominal value has a negative sign is assigned to a further oscillating circuit component 16a whose deviation of the characteristic value from the nominal value has a positive sign. An oscillating circuit component 14a whose deviation of the characteristic value from the nominal value has a positive sign is assigned to a further oscillating circuit component 16a whose deviation of the characteristic value from the nominal value has a negative sign. Oscillating circuit components 14a, 16a are assigned to one another as a function of a magnitude of a deviation of the characteristic value from the nominal value. An oscillating circuit component 14a of class 34a for characteristic values in first partial value range 40a is assigned to a further oscillating circuit component 16a from class 56a for characteristic values in third partial value range 62a. An oscillating circuit component 14a of class 38a for characteristic values in third partial value range 44a is assigned to a further oscillating circuit component 16a from class 52a for characteristic values in first partial value range 58a. An oscillating circuit component 14a of class 36a for characteristic values in second partial value range 42a is assigned to a further oscillating circuit component 16a from class 54a for characteristic values in second partial value range 60a (cf. FIG. 5). In this way, there result three assignments 70a, 72a, 74a. Depending on the demands made on a fluctuation range of the resonant frequency, an oscillating circuit component 14a having a characteristic value in first partial value range 40a or in third partial value range 44a can respectively be assigned to a further oscillating circuit component 16a having a characteristic value in second partial value range 60a. Analogously, an oscillating circuit component 14a having a characteristic value in second partial value range 42a can be assigned to a further oscillating circuit component 16a having a characteristic value in first partial value range 58a or in third partial value range 62a. There result four further assignments 76a, 78a, 80a, 82a.

Figure 6:
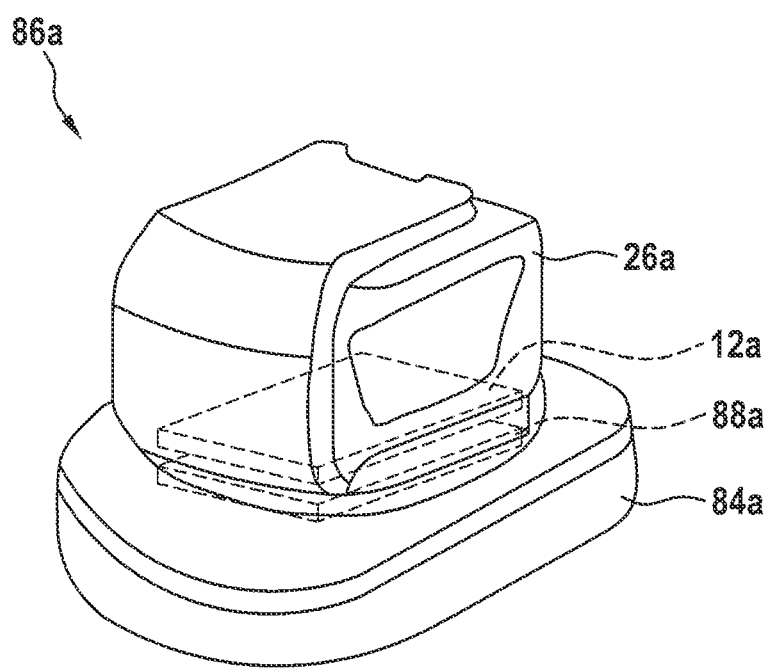
FIG. 6 shows a perspective view of a charging device with a handheld power tool accumulator pack.

FIG. 6 shows a charging device 84a and a handheld power tool accumulator pack 26a. Handheld power tool accumulator pack 26a has an interface unit 86a that is provided to electrically and mechanically couple handheld power tool accumulator pack 26a to a handheld power tool (not shown in more detail). It is conceivable that handheld power tool accumulator pack 26a is integrated in a handheld power tool. Handheld power tool accumulator pack 26a includes an inductive charging device 12a having oscillating circuit 10a, which includes inductive oscillating circuit component 14a and capacitive oscillating circuit component 16a. Inductive charging device 12a is fashioned as a receive inductive charging device. Oscillating circuit 10a is fashioned as a charge oscillating circuit and is provided for an inductive charging process. In the present exemplary embodiment, oscillating circuit 10a is fashioned as a receive oscillating circuit and is provided to convert a quantity of energy of an electromagnetic alternating field generated by charging device 84a into a charging current. Charging device 84a has a further inductive charging device 88a having a further oscillating circuit (not shown in more detail). Further inductive charging device 88a is fashioned as a transmit inductive charging device. Further inductive charging device 88a is provided to wirelessly transmit a quantity of energy to inductive charging device 12a, fashioned as a receive inductive charging device. In the present exemplary embodiment, charging device 84a is provided to be connected to a power supply network.

Oscillating circuit components 14a, 16a compensate the structurally caused deviations of their characteristic values relative to resonant frequency F of oscillating circuit 10a. Resonant frequency F is proportional to a reciprocal of the square root of a product of actual inductance L and actual capacitance C $$F = \frac{1}{2\pi\sqrt{LC}}.$$

In the present exemplary embodiment, a relative deviation of the actual capacitance of capacitive oscillating circuit component 16a corresponds approximately to the negative of a relative deviation of the actual inductance of inductive oscillating circuit component 16a. The product of the actual inductance and the actual capacitance deviates by less than 1 percent from a product of the nominal inductance and the nominal capacitance.

Figure 7:
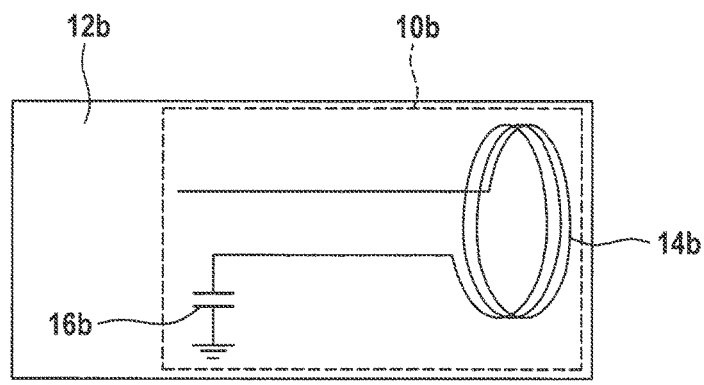
FIG. 7 shows a schematic representation of an inductive charging device of a further exemplary embodiment in which one of the oscillating circuit components is mounted for a measurement.
Figure 8:
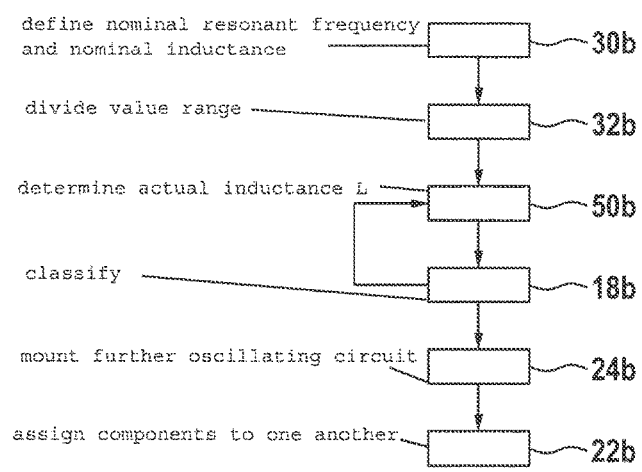
FIG. 8 shows a flow diagram for a method of the further exemplary embodiment.

FIGS. 7 and 8 show a further exemplary embodiment of the present invention. The following descriptions and the drawings are limited generally to the differences between the exemplary embodiments; with regard to components designated identically, in particular with regard to components having the same reference characters, reference is made fundamentally also to the figures and/or to the description of the other exemplary embodiments, in particular of FIGS. 1 through 6. To distinguish the exemplary embodiments, the letter "a" has been appended to the reference characters of the exemplary embodiment shown in FIGS. 1 through 6. In the exemplary embodiment of FIGS. 7 and 8, the letter "a" is replaced by the letter "b".

FIG. 7 shows a schematic representation of an inductive charging device 12b having an oscillating circuit 10b produced according to a further exemplary embodiment of the method. FIG. 8 shows a flow diagram 28b of the method. In a method step 18b, an oscillating circuit component 14b of oscillating circuit 10b is classified as a function of a structurally caused deviation of a characteristic value of the oscillating circuit component 14b from a nominal value. Oscillating circuit component 14b is fashioned, analogously to the preceding exemplary embodiment, as an inductive oscillating circuit component 14b. Oscillating circuit component 14b is fashioned as a coil that has an actual inductance L as characteristic value.

Analogous to the preceding exemplary embodiment, in a method step 30b for designing oscillating circuit 10b, a nominal resonant frequency of oscillating circuit 10b and a nominal inductance are defined as nominal value. In a preparation step 32b, a value range of the characteristic value of oscillating circuit component 14b is divided into three classes. The classes respectively correspond to a first partial value range, a second partial value range, and a third partial value range of the characteristic value.

In a method step 50b for a measurement of the characteristic value, actual inductance L is determined of oscillating circuit component 14b, fashioned as a coil. In method step 18b for classification, the structurally caused deviation of the characteristic value from the nominal value is determined. In method step 18b, oscillating circuit component 14b is assigned to one of the three classes as a function of the structurally caused deviation of the characteristic value. In method step 18b, inductive oscillating circuit component 14b is classified. Analogous to the preceding exemplary embodiment, oscillating circuit component 14b is classified as a function of a sign of the deviation of the characteristic value from the nominal value. Method step 50b for measurement and method step 18b for classification can be repeated for a plurality of oscillating circuit components 14b having the same function, for example for a plurality of coils. As a result, each of the three classes contains at least one oscillating circuit component 14b.

Differing from the preceding exemplary embodiment, a further oscillating circuit 16b is mounted in a method step 24b, and subsequently the structurally caused deviation of the characteristic value from the nominal value is determined. Further oscillating circuit component 16b is mounted on a circuit board. Further oscillating circuit component 16b is fashioned as a capacitive oscillating circuit component 16b and has an actual capacitance as characteristic value. For measurement of the characteristic value, a reference oscillating circuit component is mounted and is connected to capacitive oscillating circuit component 16b, resulting in a test oscillating circuit. In the present exemplary embodiment, an inductive reference oscillating circuit component is mounted having a known actual inductance $L_{ref}$. A resonant frequency $F_m$ is determined. The actual capacitance of further oscillating circuit component 16b results according to the equation $$C = \frac{1}{L_{ref}(2\pi F_m)^2}.$$

In a further method step 22b, the at least two oscillating circuit components 14b, 16b are assigned to one another as a function of the respective classification. In method step 22b, an oscillating circuit component 14b, fashioned as a coil, is assigned to the mounted further oscillating circuit component 16b, fashioned as a capacitor. Oscillating circuit components 14b, 16b are assigned to one another as a function of a sign of the respective structurally caused deviation of the characteristic value from the nominal value. In the present exemplary embodiment, an oscillating circuit component 14b and a further oscillating circuit component 16b are assigned to one another whose deviations have opposite signs. As a function of the actual capacitance, determined in the measurement, of further oscillating circuit component 16b, one of the oscillating circuit components 14b is selected from the classes of oscillating circuit components 14b fashioned as coils. In case of a positive deviation of the actual capacitance, an inductive oscillating circuit component 14b having a negative deviation of the actual inductance is selected. In case of a negative deviation of the actual capacitance, an inductive oscillating circuit component 14b having a positive deviation of the actual inductance is selected.

What is claimed is:

1. A method for producing an electrical oscillating circuit for an inductive charging device having at least one oscillating circuit component, the method comprising:
    classifying an inductive oscillating circuit component as a function of a structurally caused deviation of a characteristic value of the oscillating circuit component from a nominal inductance,
    classifying a capacitive oscillating circuit component as a function of a structurally caused deviation of a characteristic value of the oscillating circuit component from a nominal capacitance,
    wherein the inductive oscillating circuit component has an actual inductance, and the capacitive oscillating circuit component has an actual capacitance, and a product of the actual inductance and the actual capacitance deviates by less than 2 percent from a product of the nominal inductance and the nominal capacitance.

2. The method as recited in claim 1, further comprising:
    assigning the at least one oscillating circuit component and the at least one further oscillating circuit component to one another as a function of the respective classification.

3. The method at least as recited in claim 1, further comprising:
    assigning the at least one oscillating circuit component and the at least one further oscillating circuit component to one another at least as a function of a sign of the respective structurally caused deviation of the characteristic value from the nominal value.

4. The method as recited in claim 1, further comprising:
    mounting the at least one further oscillating circuit component, and subsequently the structurally caused deviation of the characteristic value from the nominal value is determined.

5. The method as recited in claim 4, wherein the structurally caused deviation of the characteristic value from the nominal value is determined by a measurement of a resonant frequency.

6. An inductive charging device for a handheld power tool accumulator pack having an oscillating circuit that includes an inductive oscillating circuit component that has a structurally caused deviation from a nominal inductance, and that includes a capacitive oscillating circuit component that has a structurally caused deviation from a nominal capacitance, wherein in at least one operating state the inductive oscillating circuit component and the capacitive oscillating circuit component mutually at least substantially compensate the deviations,
    wherein the inductive oscillating circuit component has an actual inductance, and the capacitive oscillating circuit component has an actual capacitance, and a product of the actual inductance and the actual capacitance deviates by less than 2 percent from a product of the nominal inductance and the nominal capacitance.

* * * * *